US011722428B2

(12) United States Patent
Yoshida

(10) Patent No.: US 11,722,428 B2
(45) Date of Patent: Aug. 8, 2023

(54) INFORMATION PROCESSING DEVICE AND METHOD OF CONTROLLING INFORMATION PROCESSING DEVICE

(71) Applicant: FUJITSU LIMITED, Kawasaki (JP)

(72) Inventor: Yuki Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 17/539,242

(22) Filed: Dec. 1, 2021

(65) Prior Publication Data

US 2022/0294744 A1 Sep. 15, 2022

(30) Foreign Application Priority Data

Mar. 9, 2021 (JP) ................................ 2021-037494

(51) Int. Cl.
*H04L 47/722* (2022.01)
*H04L 47/30* (2022.01)
*H04L 49/90* (2022.01)

(52) U.S. Cl.
CPC ............ *H04L 47/722* (2013.01); *H04L 47/30* (2013.01); *H04L 49/90* (2013.01)

(58) Field of Classification Search
CPC .............................. H04L 722/30; H04L 49/90
See application file for complete search history.

(56) References Cited

U.S. PATENT DOCUMENTS 5,996,019 A 11/1999 Hauser et al.
11,385,862 B2 * 7/2022 Ghotgalkar ............ G06F 3/061
2006/0212661 A1 * 9/2006 Inagaki ............... G06F 13/1673 711/147
2007/0015525 A1 * 1/2007 Beming ................ H04L 47/824 455/509
2012/0221669 A1 8/2012 Hashimoto
2016/0085654 A1 * 3/2016 Khoury .................. G06F 13/10 710/17
2017/0118286 A1 * 4/2017 Matsuda ................ H04L 47/80
2020/0104912 A1 * 4/2020 Malliah .................. G06F 16/29

(Continued)

FOREIGN PATENT DOCUMENTS

JP H11-511303 A 9/1999
WO 2011/058640 A1 5/2011

*Primary Examiner* — Henry Tsai
*Assistant Examiner* — Aurangzeb Hassan
(74) *Attorney, Agent, or Firm* — Fujitsu Patent Center

(57) ABSTRACT

The reception module includes a reception buffer that is shared by the first and second transmission modules to store the packet. The first transmission module is configured to: transmit, to the second transmission module, a lending request of the reception buffer allocated to the second transmission module, based on a use amount of the reception buffer allocated to the first transmission module, and increase an allocation amount of the reception buffer for the first transmission module in a case where the second transmission module has transmitted an acceptance response to the lending request. The second transmission module is configured to: receive the lending request and transmit the acceptance response to the first transmission module based on a use amount of the reception buffer allocated to the second transmission module, and decrease an allocation amount of the reception buffer for the second transmission module when transmitting the acceptance response.

4 Claims, 5 Drawing Sheets

(56) References Cited

U.S. PATENT DOCUMENTS

| | | | | |
|---|---|---|---|---|
| 2020/0264932 | A1* | 8/2020 | Maldini | H04L 67/55 |
| 2020/0280858 | A1* | 9/2020 | Yan | H04W 16/06 |
| 2020/0344322 | A1* | 10/2020 | Zhu | G06F 9/5083 |
| 2022/0101321 | A1* | 3/2022 | Jones | G06Q 20/401 |
| 2022/0256436 | A1* | 8/2022 | Guo | H04W 40/36 |

* cited by examiner

1
ENDPOINT
203
ENDPOINT
204
SoC
ROOT PORT
RECEPTION BUFFER
130
103
ROOT PORT
104
112
RS
RS
150
105
RS
RS
RS
SOCKET CONNECT
302
RECEPTION BUFFER
321
SoC
SOCKET CONNECT
301
111
RECEPTION BUFFER
311
105
RS
RS
RS
150
RS
RS
ROOT PORT
101
ROOT PORT
102
ENDPOINT
201
ENDPOINT
202

INFORMATION PROCESSING DEVICE AND METHOD OF CONTROLLING INFORMATION PROCESSING DEVICE

CROSS-REFERENCE TO RELATED APPLICATION

This application is based upon and claims the benefit of priority of the prior Japanese Patent Application No. 2021-37494, filed on Mar. 9, 2021, the entire contents of which are incorporated herein by reference.

FIELD

The embodiments discussed herein are related to an information processing device and a method of controlling an information processing device.

BACKGROUND

In a case of communicating between two parties, it is common that a device on a data reception side prepares a reception buffer, and a device on a transmission side controls a flow so that the reception buffer of the device on the reception side does not overflow. The flow refers to a flow of a series of data packets from the device on the transmission side to the device on the reception side.

Japanese National Publication of International Patent Application No. 11-511303 and International Publication Pamphlet No. WO 2011/58640 are disclosed as related art.

SUMMARY

According to an aspect of the embodiments, an information processing device includes: a reception module; and a first transmission module and a second transmission module configured to transmit a packet to the reception module. The reception module includes a reception buffer that is shared by the first transmission module and the second transmission module to store the packet. The first transmission module is configured to: transmit, to the second transmission module, a lending request of the reception buffer allocated to the second transmission module, on a basis of a use amount of the reception buffer allocated to the first transmission module, and increase an allocation amount of the reception buffer for the first transmission module in a case where the second transmission module has transmitted an acceptance response to the lending request. The second transmission module is configured to: receive the lending request and transmit the acceptance response to the first transmission module on a basis of a use amount of the reception buffer allocated to the second transmission module, and decrease an allocation amount of the reception buffer for the second transmission module in a case of transmitting the acceptance response.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
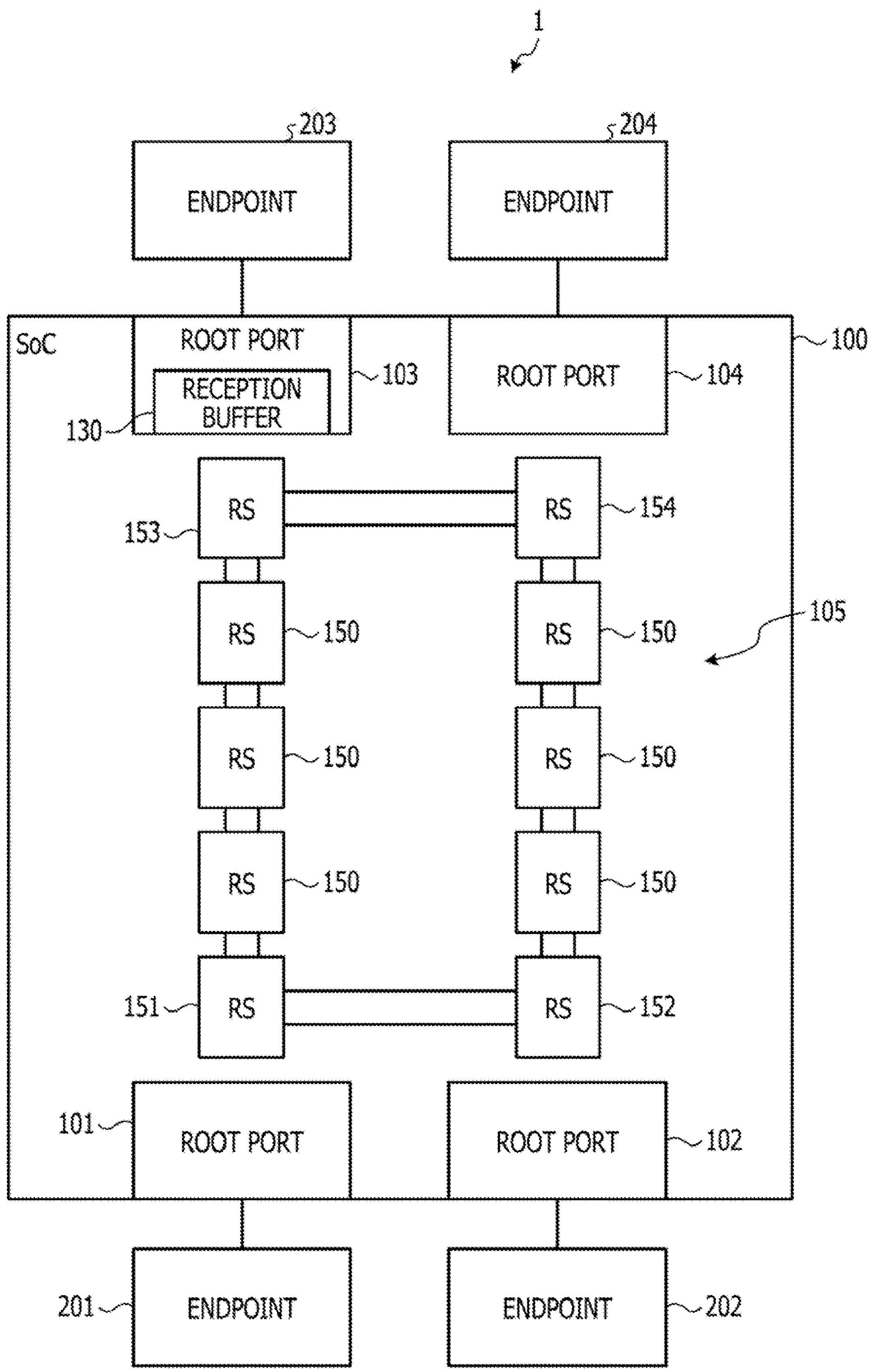
FIG. 1 is a configuration diagram of an information processing device according to a first embodiment.

As one of the flow control, there is a credit method by hardware. In the credit method by hardware, when received data on the reception buffer is read from the reception buffer, the device on the reception side notifies the device on the transmission side of a read amount, informing that the reception buffer becomes free corresponding to the read amount. Thereby, the device on the transmission side can determine a free status of the reception buffer of the device on the reception side. When a value obtained by subtracting the notified read amount from a transmission amount is equal to or less than a reception buffer size, the device on the transmission side can determine that the reception buffer of the device on the reception side has space.

In a case of securing certain communication throughput performance, basically, a buffer size equal to or larger than a buffer size determined by an equation: the reception buffer size=reception buffer read notification latency×target throughput is preset for the reception buffer of the device on the reception side. Thereby, the reception buffer does not overflow even if transmission is continued with throughput desired by the device on the transmission side. Here, the reception buffer read notification latency is a time until the packet transmitted by the device on the transmission side is read from the reception buffer of the device on the reception side and the read is notified to the device on the transmission side.

However, in a case where resources available for communication are limited, it is not always possible to secure a sufficient reception buffer size for the target maximum throughput performance. For example, in a case where a plurality of transmission sources is present, the device on the reception side has the reception buffer for each transmission source. In such a case, as the number of transmission sources increases, it becomes difficult for the device on the reception side to secure a sufficient reception buffer for each device on the transmission side. Therefore, a technique for dynamically changing the reception buffer size according to a communication load has been proposed.

As the technique for dynamically changing the reception buffer size according to the communication load, for example, there are the following techniques. The reception side secures an initial buffer size determined in advance on the reception side at the start of communication or the reception buffer size requested by the transmission side. At this time, in the case where the device on the reception side determines the initial buffer size, the transmission side is notified of the secured buffer size. Thereafter, in a case where the communication data amount increases and the buffer becomes insufficient or is likely to be insufficient, the buffer size is increased in a case where the reception buffer size can be increased by determination of the device on the reception side or a request of the transmission side. Furthermore, in a case where the communication data decreases, the buffer size is reduced. In the case where the reception buffer size is changed, the device on the reception side notifies the device on the transmission side of the change in the reception buffer size. Thereby, for example, the device on the reception side that communicates with a plurality of devices on the transmission side increases the reception buffer size for the other side with a large communication amount and decreases the reception buffer size for the rest, thereby securing the throughput performance while limiting the total resources.

Note that, as a technique for the device on the reception side to communicate with a plurality of devices on the transmission side, there is a technique for controlling the overall flow of the devices on the transmission side using a receiver cell buffer shared by the devices on the transmission side. Furthermore, there is also a technique in which a reception-side node notifies each of a plurality of transmission-side nodes of allocation of a communication buffer shared among all the plurality of transmission-side nodes by broadcast communication, and a device on the transmission side performs communication using the allocated communication buffer.

For example, in a case of communication in which a reception buffer is secured and used on a main memory of a computer, the buffer size can be increased as requested because the main memory is sufficiently present. However, in communication by a peripheral component interconnect express (PCIe) (registered trademark) bus or communication by mounting hardware in the same chip, an SRAM mounted on the chip or the like is used as a buffer. Therefore, in a high-performance system on a chip (SoC) in which a PCIe controller is mounted together with a CPU, a memory controller, and the like, the mounting area is limited, and it is difficult to mount a sufficient amount of buffers.

In such a case, in a case where a plurality of transmission modules transmits data to one reception module, if an allocation amount to a certain transmission module is increased in the reception buffer with a limited size, the allocation amount to the other transmission modules is decreased, and it is not allowed to endlessly increase the allocation amount.

An example case is considered herein, in which there are two modules, more specifically, a first transmission module and a second transmission module for one reception module, and half of a total buffer size of the reception module is allocated to each transmission module in an initial state. When the first transmission module is transmitting data to the reception module, the first transmission module determines that the reception buffer allocated thereto will overflow at some point, and requests the reception module to increase reception buffer allocation in order to secure throughput performance. The reception module reallocates a part of the reception buffer allocated to the second transmission module to the first transmission module in response to the request. At this time, even if the reception buffer allocated to the second transmission module has a space, it is unknown that when the second transmission module transmits data. Therefore, the reception module sends a reception buffer allocation reduction request to the second transmission module. Then, the reception module can notify the first transmission module of the increase in the reception buffer allocation only after receiving permission to reduce the reception buffer from the second transmission module.

In this case, it takes at least two round-trip communication times between the reception module and the transmission modules to change allocation sizes of the reception buffer. During this delay time, it becomes difficult for the first transmission module to continue sending data to the reception module with the target throughput, and a delay occurs before the throughput reaches the target performance. Furthermore, even if a throughput rise delay is allowed, in a case where the first transmission module and the second transmission module alternately transmit a certain amount of data, for example, allocation of the reception buffer for each transmission module is not able to catch up, and there is a risk of unnecessary adjustment.

Furthermore, it is difficult to shorten a procedure of changing the allocation size of the reception buffer even using the technique of using a receiver cell buffer shared by the devices on the transmission side or the technique in which a reception-side node notifies a plurality of transmission-side nodes of allocation of a communication buffer shared among all the plurality of transmission-side nodes by broadcast communication. Therefore, it is difficult to secure the throughput performance even using these existing techniques.

The disclosed technique has been made in view of the foregoing, and an object is to provide an information processing device and a method of controlling the information processing device, for securing throughput performance.

Embodiments of an information processing device and a method of controlling an information processing device disclosed by the present application will be described in detail below on the basis of the drawings. Note that the following embodiments do not limit the information processing device and the method of controlling an information processing device disclosed in the present application.

First Embodiment

FIG. 1 is a configuration diagram of an information processing device according to a first embodiment. As illustrated in FIG. 1, an information processing device 1 according to the present embodiment has an SoC 100 and endpoints 201 to 204.

The endpoints 201 to 204 are input/output (I/O) devices in PCIe. The endpoints 201 to 204 are, for example, a graphics processing unit (GPU), a network interface, a hard disk, and the like.

The SoC 100 is equipped with a plurality of PCIe root ports 101 to 104 together with a CPU and main memory (not illustrated). The root ports 101 to 104 are connected to the endpoints 201 to 204. The root ports 101 to 104 are ports for linking a PCIe device outside the SoC 100 with the SoC 100.

In PCIe, a method called peer-to-peer is defined, in which the endpoints 201 to 204 connected to the root ports 101 to 104, respectively, directly communicate with one another. A communication procedure in a case where two of the endpoints 201 to 204, which are to communicate, are connected to different root ports 101 to 104 will be described by taking a case where the endpoint 201 is a transmission source and the endpoint 203 is a transmission destination as an example. The endpoint 201 as the transmission source transmits a packet to the connected root port 101. The root port 101, which has received the packet, transmits the packet to the root port 103 connected to the endpoint 203 as the transmission destination. The root port 103 forwards the packet to the endpoint 203 as the transmission destination. The endpoints 201 to 204 and the root ports 101 to 104 respectively connected thereto communicate with one another by the method defined in PCIe. Communication among the root ports 101 to 104 is not clearly defined in PCIe.

In the present embodiment, the root ports 101 to 104 are connected to the endpoints 201 to 204 at 32 Gbps speed and 16 lanes of PCIe. Furthermore, inside the SoC 1, the respective root ports 101 to 104 are connected by a ring bus 105 so as to communicate with one another. Ring stops (RSs) 150 and 151 to 154 are arranged on the ring bus 105 for each unit that communicates inside the SoC 1. The root ports 101 to 104 use the ring stops 151 to 154, respectively, arranged at the positions closest to them in FIG. 1 as connection points for communication by the ring bus 105. Furthermore, the other ring stops 150 (not illustrated) are arranged so as to correspond to other units such as a CPU core and a memory controller, and respectively serve as connection points for communication by the ring bus 105 of corresponding units. In the following description, in a case where the ring stop 150 and 151 to 154 are not distinguished, they are collectively referred to as "ring stop(s) 150".

For example, in the case where the root port 101 transmits a packet to the root port 103, the root port 101 transmits the packet from the ring stop 151. The packet transmitted from the ring stop 151 is carried to the ring stop 153 via the ring stops 150 on the ring bus 105. When the packet arriving at the ring stop 153 is addressed to the root port 103, the root port 103 receives the packet.

Here, the more ring stops 150 the packet passes through, the longer it takes for the packet to reach its destination. In the present embodiment, for the sake of simplicity, the description will be given assuming that the time for communication using the ring stop 150 is proportional to the number of ring stops 150 between units, and it takes 32 nsec from a certain ring stop 150 to the adjacent ring stop 150. For example, it takes 128 nsec for the packet to arrive from the root port 101 to the root port 103.

Normally, the root port 103 continues to sequentially transmit data packets to the endpoint 203, but for example, quality of a PCIe transmission path between the root port 103 and the endpoint 203 may be slightly unstable and the packets are not able to be temporarily transmitted and are retransmitted. At that time, the root port 103 temporarily becomes unable to sequentially transmit the data packets that have been continuously received from the root port 101. Therefore, the root port 103 stores the data packets received from the root port 101 in a reception buffer 130. If such a situation continues, a space area of the reception buffer 130 runs out and overflows, making it difficult for the root port 103 to receive the data packets. Therefore, the root port 101 controls transmission so that the reception buffer 130 of the root port 103 does not overflow.

Here, the latency, which is a transmission time when the data packet is transmitted from the root port 101 to the root port 103, is 128 sec as described above. The transmission latency from the root port 103 to the root port 101 is also 128 sec. In a case where the root port 101 continues to transmit the packets at 64 GB/sec, the capacity of 64 GB/sec×256 nsec=16 kB is consumed in the reception buffer 130 of the root port 103 for 256 nsec. Assuming that the reception buffer 130 of the root port 103 is 16 kB, the root port 101 stops the transmission here. Meanwhile, in a case where the communication with the endpoint 203 is not delayed, the root port 103 sequentially transmits the packets received from the root port 101 to the endpoint 203, so that the reception buffer 130 has a space immediately. Then, the root port 103 notifies the root port 101 that the reception buffer 130 has a space. In this case, the root port 101 knows the space after 256-nsec round trip after transmitting the data packet. Therefore, the root port 101 stops transmitting the data packets after 256 nsec if the root port 101 does not know the space of the reception buffer 130, but the root port 101 know the space of the reception buffer 130 at timing after 256 nsec and can transmit the additional packets. For example, the root port 101 can continuously transmit the packets with the throughput of 64 GB/sec.

Note that, practically, an internal processing time is consumed from the reception to transmission of the packet by the root port 103, and an internal delay time after the root port 101 is notified that the reception buffer 130 has space to when the notification is reflected in a transmission control circuit is consumed. However, here, description is given disregarding these consumption times for the sake of simplicity.

Here, in the present embodiment, the size of the reception buffer 130 is set as, for example, 16 kB. This value is calculated as 256 nsec×64 GB/sec=16 kB on the basis of the time 256 nsec to when the root port 101 knows the transmitted data packet has been read from the reception buffer 130, for example, the reception buffer 130 has had space (one-way communication latency 128 nsec×2) and the target throughput performance of 64 GB/sec.

Next, a case where the endpoint 202 transmits a data packet to the endpoint 203 will be described. In this case, the one-way communication latency between the root port 102 and the root port 103 is 144 nsec, but others can be considered in the same manner as the above-described case of transmission from the endpoint 201 to the endpoint 203. Therefore, in a case where the root port 103 side has the reception buffer 130 of (144 nsec×2)×64 GB/sec=18 kB, the root port 102 can obtain the throughput performance of 64 GB/sec.

Note that, in a case where the number of transmission sources that transmit data packets to the root port 103 increases, it is not realistic for the root port 103 to have such a reception buffer 130 for each transmission source in terms of mounting area. This is because even if the root port 101 and the root port 102 can transmit the data packets to the root port 103 at the same time with the throughput of 64 GB/sec, the throughput between the root port 103 and the endpoint 203 beyond is also only 64 GB/sec, therefore, it is sufficient that the total throughput of transmission from the root port 101 and the root port 102 is 64 GB/sec. Therefore, it can be said to be inefficient that the root port 103 individually has separate reception buffers 130 with the size satisfying 64 GB/sec between the root port 101 and the root port 103 and between the root port 102 and the root port 103.

Therefore, in the present embodiment, in the case where the root port 101 and the root port 102 transmit the data packets to the root port 103, the area of the reception buffer 130 whose use is limited to the root port 101 is set to 4 kB. Furthermore, the area of the reception buffer 130 whose use is limited to the root port 102 is 6 kB. Then, a shared area of the reception buffer 130 that can be used by both the root port 101 and the root port 102 is set to 12 kB, and the shared area of 12 kB is flexibly accommodated between the root port 101 and the root port 102 depending on the situation, whereby the size of the reception buffer 130 of the root port 103 can be reduced. Specifically, in an initial stage, half of the shared area of the reception buffer 130 is allocated to each of the root ports 101 and 102, and a total of 10 kB is set for the root port 101 and a total of 12 kB is set for the root port 102. Then, the root port 101 and the root port 102 secure the throughput by flexibly accommodating the shared area of the reception buffer 130 according to a use amount. The processing of flexibly accommodating the shared area of the reception buffer 130 according to the use amount will be described in detail below.

Figure 2:
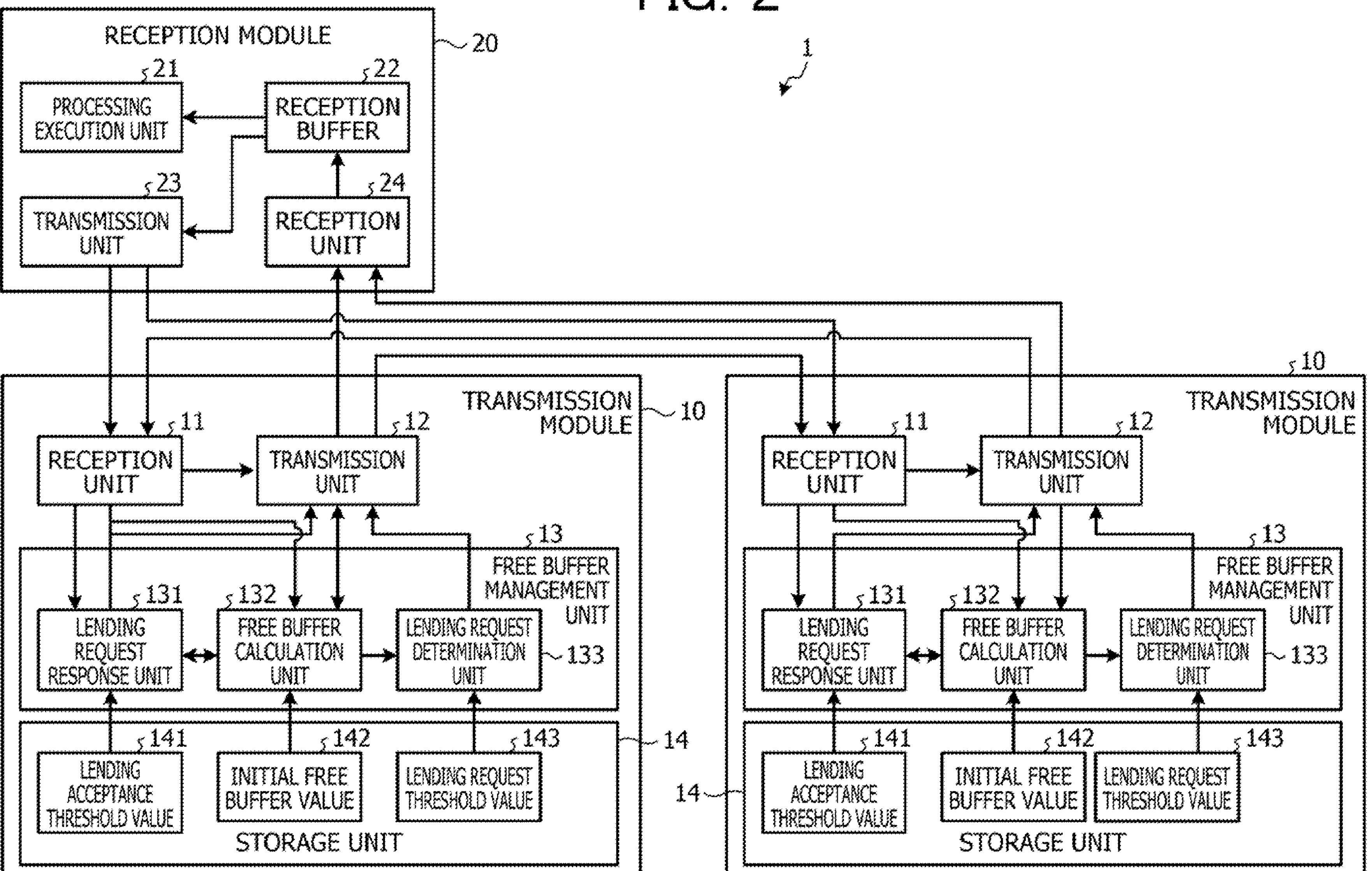
FIG. 2 is a block diagram of a root port that transmits and receives data packets.

FIG. 2 is a block diagram of a root port that transmits and receives data packets. In FIG. 2, the side that transmits packets in the root ports 101 to 104 is represented as a transmission module 10, and the side that receives the packets is represented as a reception module 20. The root ports 101 to 104 can be either the transmission module 10 or the reception module 20 depending on the direction of packet transmission/reception. Next, the operation at the time of packet transmission of the root ports 101 to 104 will be described with reference to FIG. 2.

The reception module 20 will be described. The reception module 20 receives the data packet transmitted from the transmission module 10. The reception module 20 includes a processing execution unit 21, a reception buffer 22, a transmission unit 23, and a reception unit 24.

The reception buffer 22 is, for example, a shared area of the reception buffer 130 in FIG. 1. The reception buffer 22 temporarily stores the data packets transmitted from the transmission modules 10. The size of the reception buffer 22 is determined on the basis of the read latency of the reception buffer 22 and the target throughput.

The processing execution unit 21 acquires the data packet from the reception buffer 22. Then, the processing execution unit 21 executes processing for the acquired data packet.

The transmission unit 23 transmits a data packet processing notification including size information of the fetched data packet to the transmission module 10 as the transmission source of the data packet when the data packet is fetched from the reception buffer 22 by the processing execution unit 21.

The reception unit 24 acquires the data packets from the transmission modules 10. Then, the reception unit 24 stores the acquired data packets in the reception buffer 22.

The transmission module 10 transmits the data packet to the reception module 20. As illustrated in FIG. 2, the transmission module 10 includes a reception unit 11, a transmission unit 12, a free buffer management unit 13, and a storage unit 14.

The storage unit 14 stores a lending acceptance threshold value 141, an initial free buffer value 142, and a lending request threshold value 143. The lending acceptance threshold value 141 is a threshold value for determining whether to allow lending of a free buffer allocated to the transmission module 10 on which the lending acceptance threshold value 141 itself is mounted. The initial free buffer value 142 represents an allocation amount in the reception buffer 22, which is allocated as a free buffer at startup. In the present embodiment, the same value is used as the initial free buffer value 142 for all of the root ports 101 to 104. For example, at startup, the area of the reception buffer 22 of the reception module 20 is equally divided among the transmission modules 10 that are the transmission sources of the packets. The lending request threshold value 143 is a threshold value for determining whether to request lending of the free buffer allocated to another transmission module 10 sharing the reception buffer 22. The lending request threshold value 143 is a value smaller than the lending acceptance threshold value 141.

The reception unit 11 receives the data packet processing notification indicating that the reception buffer 22 has space because the staying data packet in the reception buffer 22 of the reception module 20 has been read and processed, from the transmission unit 23 of the reception module 20. Then, the reception unit 11 notifies the free buffer calculation unit 132 of the newly increased free buffer size in the allocated area of the reception buffer 22.

Furthermore, the reception unit 11 receives a lending request packet requesting lending from its own allocation of the reception buffer 22, from the transmission unit 12 of the another transmission module 10 sharing the reception buffer 22. Then, the reception unit 11 requests the lending request response unit 131 to determine whether the lending is possible.

Furthermore, the reception unit 11 receives a lending response, which is a response to the lending request packet, from the transmission unit 12 of the another transmission module 10 sharing the reception buffer 22. Then, in a case where the received lending response is content notifying lending acceptance, the reception unit 11 outputs a lending acceptance notification to the free buffer calculation unit 132. Furthermore, in a case where the received lending response is content notifying lending refusal, the reception unit 11 requests the transmission unit 12 to resend the lending request. Note that if conditions for the lending request have been resolved at that time, the reception unit 11 does not have to request resending.

When transmitting the data packet, the transmission unit 12 sends a free buffer value notification request at that time to the free buffer calculation unit 132. Then, in a case where the free buffer value in the reception buffer 22 at that time is equal to or larger than the size of the data packet to be transmitted, the transmission unit 12 transmits the data packet to the reception unit 24 of the reception module 20. Moreover, the transmission unit 12 notifies the free buffer calculation unit 132 of the data packet transmission to the reception module 20 together with the data packet size. On the other hand, in a case where the free buffer value at that time is smaller than the size of the data packet to be transmitted, the transmission unit 12 sends the free buffer value notification request to the free buffer calculation unit 132 and waits until the free buffer with the size equal to or larger than the data packet to be transmitted can be secured.

Furthermore, the transmission unit 12 receives an instruction to transmit the lending request packet from the lending request determination unit 133. Then, the transmission unit 12 transmits the acquired lending request packet to the reception unit 11 of the another transmission module 10 sharing the reception buffer 22, and makes a lending request.

After that, in the case where the reception unit 11 receives the lending response notifying the lending refusal to the lending request, the transmission unit 12 receives the request for resending the lending request from the reception unit 11. Then, the transmission unit 12 retransmits the lending request packet to the reception unit 11 of the another transmission module 10 sharing the reception buffer 22. Note that the transmission unit 12 does not have to immediately retransmit the lending request packet, and may retransmit the lending request packet after waiting for a predetermined time. Furthermore, if the conditions for the lending request have been resolved at that time, the transmission unit 12 does not have to request resending.

Furthermore, the transmission unit 12 receives an instruction to transmit the lending response from the lending request response unit 131. Then, the transmission unit 12 transmits the lending response acquired from the lending request response unit 131 to the reception unit 11 of the transmission module 10, which is the lending request transmission source sharing the reception buffer 22.

The free buffer management unit 13 manages the free buffer in the reception buffer 22 allocated to the transmission module 10 on which the free buffer management unit 13 itself is mounted. The free buffer management unit 13 has a lending request response unit 131, a free buffer calculation unit 132, and a lending request determination unit 133.

The lending request response unit 131 acquires the lending request packet from the another transmission module 10 sharing the reception buffer 22, from the reception unit 11.

Then, the lending request response unit 131 sends the free buffer value notification request to the free buffer calculation unit 132, and acquires the free buffer value at that time. Next, the lending request response unit 131 acquires the lending acceptance threshold value 141 stored in the storage unit 14.

Then, the lending request response unit 131 compares the free buffer value at that time with the lending acceptance threshold value 141. In a case where the free buffer value at that time is equal to or larger than the lending acceptance threshold value 141, the lending request response unit 131 creates a lending response notifying lending acceptance. Here, a value obtained by subtracting the lending request threshold value 143 from the lending acceptance threshold value 114 is a value larger than a lending unit amount, which is the size of a predetermined free buffer to be lent to the lending request.

Furthermore, in a case where the free buffer value at that time is less than the lending acceptance threshold value 141, the lending request response unit 131 creates a lending response notifying lending refusal. The lending acceptance threshold value 141 is, for example, a value corresponding to a ratio of 20 or 30 when the size of the initial free buffer value 142 is 100. Thereafter, the lending request response unit 131 instructs the transmission unit 12 to transmit a lending request response to the transmission module 10 as the transmission source of the lending request. Here, in a case where the lending request response is the content of lending acceptance, the lending request response unit 131 notifies the free buffer calculation unit 132 of lending of the free buffer.

The free buffer calculation unit 132 acquires the initial free buffer value 142 in the reception buffer 22 of the reception module 20 to serve as the transmission destination of the packet at startup, and sets the initial free buffer value 142 as an initial free buffer value.

When the transmission unit 12 transmits the data packet to the reception module 20, the free buffer calculation unit 132 receives a data packet transmission notification together with the data packet size from the transmission unit 12. Then, the free buffer calculation unit 132 subtracts the notified data packet size from the free buffer value at that time to obtain a new free buffer value. Then, in the case of reducing the free buffer value, the free buffer calculation unit 132 notifies the lending request determination unit 133 of the free buffer value at that time and instructs lending request determination.

Furthermore, the free buffer calculation unit 132 receives the free buffer value notification request from the transmission unit 12. Then, the free buffer calculation unit 132 notifies the transmission unit 12 of the free buffer value at that time.

Furthermore, in a case where the data packet is fetched from the reception buffer 22 by the processing execution unit 21, the free buffer calculation unit 132 receives a newly increased free buffer size notification from the reception unit 11. Then, the free buffer calculation unit 132 adds the newly increased free buffer size to the free buffer value at that time to obtain a new free buffer value.

Furthermore, the free buffer calculation unit 132 receives the free buffer value notification request from the lending request response unit 131. Then, the free buffer calculation unit 132 notifies the lending request response unit 131 of the free buffer value at that time.

Furthermore, the lending request response unit 131 transmits the lending request response notifying the lending acceptance, the free buffer calculation unit 132 receives free buffer lending notification from the lending request response unit 131. Then, the lending request response unit 131 subtracts the predetermined lending unit amount from the free buffer value at that time to obtain a new free buffer value.

Furthermore, in a case where the response to the lending request made to the another transmission module 10 is the content notifying lending acceptance, the free buffer calculation unit 132 receives the lending acceptance notification from the reception unit 11. Then, the free buffer calculation unit 132 adds the predetermined lending unit amount to the free buffer value at that time to obtain a new free buffer value.

The lending request determination unit 133 receives a lending request determination instruction together with the free buffer value notification at that time from the free buffer calculation unit 132. Next, the lending request determination unit 133 acquires the lending request threshold value 143 from the storage unit 14.

Then, the lending request determination unit 133 compares the free buffer value at that time with the lending request threshold value 143. In a case where the free buffer value at that time is equal to or larger than the lending request threshold value 143, the lending request determination unit 133 determines that the lending request is unnecessary.

On the other hand, in a case where the free buffer value at that time is less than the lending request threshold value 143, the lending request determination unit 133 determines whether the lending request is already being made. In a case where the lending request is not being made, the lending request determination unit 133 generates the lending request packet requesting lending of the free buffer to the another transmission module 10 sharing the reception buffer 22. Then, the lending request determination unit 133 instructs the transmission unit 12 to transmit the generated lending request packet. The lending request threshold value 143 is a value smaller than the lending acceptance threshold value 141, and is, for example, a value corresponding to a ratio of 10 or 20 when the size of the initial free buffer value 142 is 100.

The lending acceptance threshold value 141 and the lending request threshold value 143 may be uniquely determined depending on the nature of communication to be executed, such as values so as not to be frequently lent or borrowed. Furthermore, a register that stores some set values as the lending acceptance threshold value 141 and the lending request threshold value 143 may be prepared, and the values of the lending acceptance threshold value 141 and the lending request threshold value 143 may be selected and set by software depending on how much lending and borrowing is performed in the information processing device 1.

Here, a method of determining the transmission module 10 that makes a lending request in a case where the number of transmission modules 10 is N (N>2) will be described. For example, the transmission module 10 that makes a lending request selects one of the other transmission modules 10 and makes a lending request, and in a case of receiving the lending response of lending refusal, the transmission module 10 makes a lending request to further another transmission module 10. The transmission module 10 that makes a lending request repeats the lending request by sequentially selecting another unselected transmission module 10 one by one until the lending response of lending acceptance arrives.

In addition, in a case where a certain transmission module 10 refuses the lending request, the certain transmission module 10 transfers the lending request to another transmission module 10 other than the lending request source, and sequentially transfers the lending request until reaching the transmission module 10 that can accept lending. Then, when the lending request is transferred to the transmission module 10 that can accept lending, the transmission module 10 may transmit the lending response of lending acceptance to the transmission module 10 as the lending request source.

Figure 3:
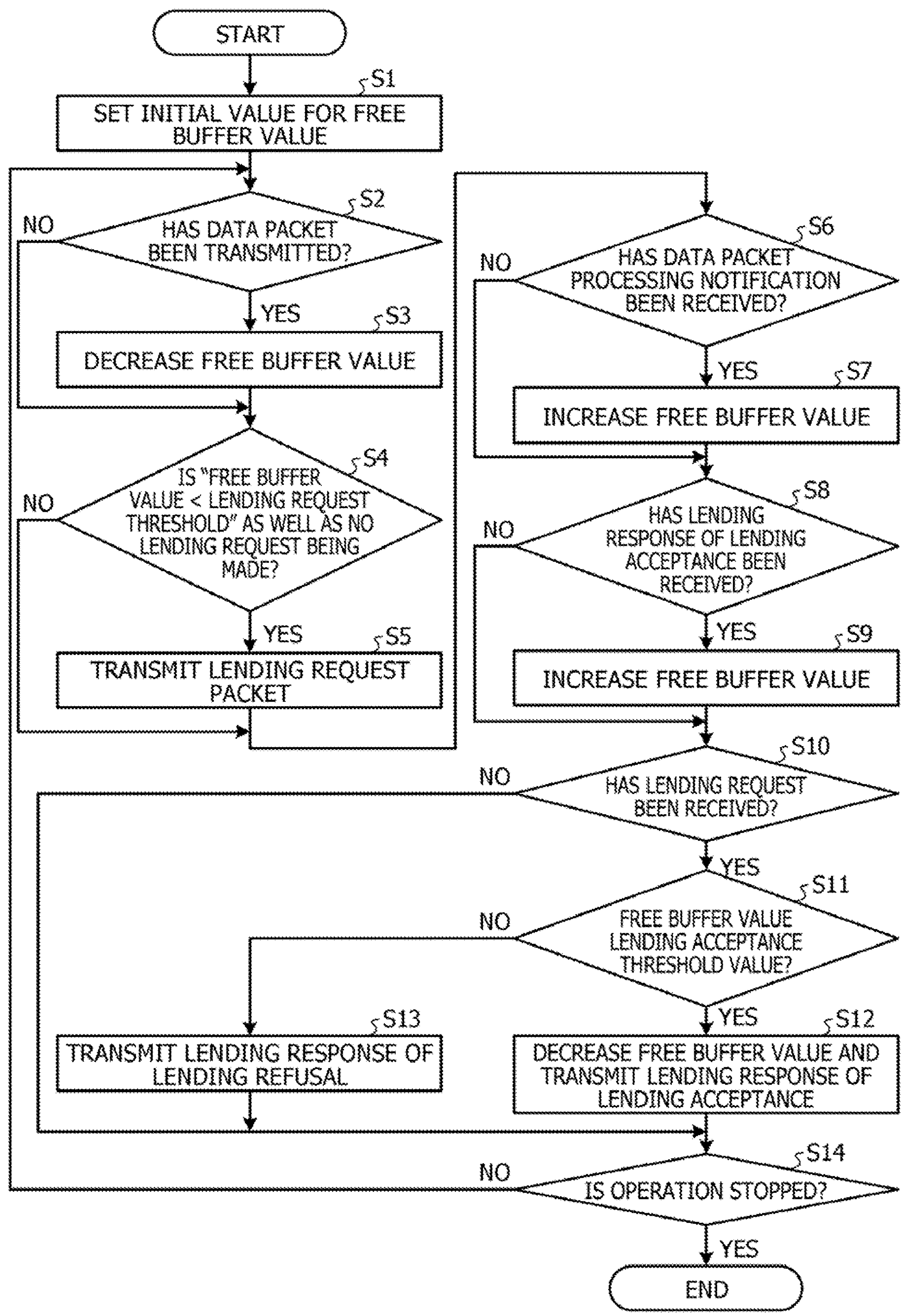
FIG. 3 is a flowchart of free buffer management processing by the information processing device according to the first embodiment.

FIG. 3 is a flowchart of free buffer management processing by the information processing device according to the first embodiment. Next, a flow of data packet transmission processing by the information processing device 1 according to the first embodiment will be described with reference to FIG. 3. The free buffer management processing to be described below is performed in parallel with data packet transmission to the reception module 20 by the transmission unit 12.

The free buffer calculation unit 132 acquires the initial free buffer value 142 from the storage unit 14 and sets the initial free buffer value 142 for the free buffer value as the initial value (step S1).

Thereafter, the free buffer calculation unit 132 determines whether the transmission unit 12 has transmitted the data packet to the reception module 2 on the basis of the presence or absence of the data packet transmission notification from the transmission unit 12 (step S2). In the case where the transmission unit 12 has not transmitted the data packet to the reception module 2 (step S2: negative), the free buffer management processing proceeds to step S4.

On the other hand, in the case where the transmission unit 12 has transmitted the data packet to the reception module 2 (step S2: affirmative), the free buffer calculation unit 132 reduces the free buffer value by the size of the transmitted data packet (step S3).

The lending request determination unit 133 determines whether the free buffer value is less than the lending request threshold value 143 as well as no lending request is being made to another transmission module 10 (step S4). In the case where the free buffer value is equal to or larger than the lending request threshold value 143 or the lending request is being made (step S4: negative), the free buffer management processing proceeds to step S6.

On the other hand, in the case where the free buffer value is less than the lending request threshold value 143 and the lending request is not being made (step S4: affirmative), the lending request determination unit 133 instructs the transmission unit 12 to transmit the lending request packet. The transmission unit 12 transmits the lending request packet to the another transmission module 10 sharing the reception buffer 22 in response to the instruction from the lending request determination unit 133 (step S5).

Furthermore, the free buffer calculation unit 132 determines whether the data packet processing notification has been received according to the presence or absence of the newly increased free buffer size notification from the reception unit 11 (step S6). In the case where the data packet processing notification has not been received (step S6: negative), the free buffer management processing proceeds to step S8.

On the other hand, in the case where the data packet processing notification is received (step S6: affirmative), the free buffer calculation unit 132 increases the free buffer value by the notified newly increased free buffer size (step S7).

Furthermore, the free buffer calculation unit 132 determines whether the lending response of lending acceptance has been received from the another transmission module 10 (step S8). In the case where the lending response of lending acceptance has not been received (step S8: negative), the free buffer management processing proceeds to step S10.

On the other hand, in the case where the lending response of lending acceptance has been received (step S8: affirmative), the free buffer calculation unit 132 increases the free buffer value by the lending unit amount (step S9).

Furthermore, the lending request response unit 131 determines whether the lending request has been received from the another transmission module 10 sharing the reception buffer 22 (step S10). In the case where the lending request has not been received (step S10: negative), the free buffer management processing proceeds to step S14.

On the other hand, in the case where the lending request has been received (step S10: affirmative), the lending request response unit 131 determines whether the free buffer value is equal to or larger than the lending acceptance threshold value 141 (step S11).

In the case where the free buffer value is equal to or larger than the lending acceptance threshold value 141 (step S11: affirmative), the lending request response unit 131 creates the lending response notifying lending acceptance, instructs the transmission unit 12 to transmit the lending response and notifies the free buffer calculation unit 132 of the lending acceptance. The free buffer calculation unit 132 reduces the free buffer value by the lending unit amount. Furthermore, the transmission unit 12 transmits the lending response of lending acceptance to the transmission module 10 as the transmission source of the lending request (step S12).

On the other hand, in the case where the free buffer value is less than the lending acceptance threshold value 141 (step S11: negative), the lending request response unit 131 creates the lending response notifying lending refusal and instructs the transmission unit 12 to transmit the lending response. The transmission unit 12 transmits the lending response of lending refusal to the transmission module 10 as the transmission source of the lending request (step S13).

Thereafter, the free buffer management unit 13 determines whether to stop the operation according to the presence or absence of operation stop instruction by an operator such as the information processing device 1 being powered off (step S14). In the case where the operation of the information processing device 1 continues (step S14: negative), the free buffer management processing proceeds to step S2. On the other hand, in the case where the operation of the information processing device 1 is stopped (step S14: affirmative), the free buffer management unit 13 terminates the free buffer management processing.

Here, in the present embodiment, return of the allocation of the lent reception buffer 22 has not been described, but the method below can be adopted as a return method. For example, in the case where the free buffer value exceeds a predetermined return threshold value, the free buffer management unit 13 sends a return notification to the transmission module 10 as a lending source and reduces the free buffer value. In addition, the free buffer management unit 13 may lend the area when the lending request is received, where the lending itself is awarded without the return processing.

Next, returning to FIG. 1, comparison between a case where the information processing device 1 according to the present embodiment flexibly accommodates the shared area of the reception buffer 130 and a case where the shared area of the reception buffer 130 is flexibly accommodated via the reception side will be described.

First, the case where the shared area of the reception buffer 130 is flexibly accommodated via the reception side will be described. The root port 101 transmits an allocation size increase request packet of the shared area of the reception buffer 130 to the root port 103 at the same time with first receiving the data packet from the endpoint 201 and transmitting the data packet to the root port 103. In this case, when the root port 103 transmits the packet notifying the space of the reception buffer 130 to the root port 101 when the root port 103 receives the data packet and transmits the data packet to the endpoint 203. Here, the packet notifying the increase in the allocation of the reception buffer 130 from the root port 103 to the root port 101 does not reach the root port 101 earlier than the packet notifying the space of the reception buffer 130. This is because the root port 103 transmits the packet asking whether to reduce the shared area allocated to the root port 102 to the root port 102 and receives a response, and is thus delayed by that time. In this way, if an attempt is made to adjust the increase/decrease in the allocation of the shared area of the reception buffer 130 via the root port 103, the throughput performance will not be exerted. In this case, the performance is not exerted during 544 nsec that is a total of the round-trip of 256 nsec of the allocation increase request between the root port 101 and the root port 103+ the response, and the round-trip of 288 nsec of the allocation decrease request between the root port 103 and the root port 102+ the response.

In contrast, in the present embodiment, the root port 101 can directly request the root port 102 to flexibly accommodate the buffer allocated to the root port 102 that the root port 103 has. Therefore, the reception buffer size can be increased by the round trip of 64 nsec with the communication delay of 32 nsec between the root port 101 and the root port 102. At the root port 103, no delay occurs unless the amount of data packets received from the root port 101 and the root port 102 exceeds 10 kB+12 kB=22 kB. Therefore, the root port 103 does not have to be aware of the increase or decrease in the buffer amount between the root port 101 and the root port 102.

As described above, in the present embodiment, the allocation amount of the reception buffer 130 to the root port 101 can be increased after 64 nsec. Then, the amount transmitted by the root port 101 to the root port 103 with the throughput of 64 GB/sec during the 64 nsec is 64 nsec×64 GB/sec=4 kB. This is well below the size of 10 kB initially allocated to the root port 101 in the reception buffer 130. Therefore, the size allocated to the root port 101 in the reception buffer 130 can be increased before the reception buffer 130 becomes full and transmission is stopped. For example, the reception buffer size does not become a bottleneck for the throughput. Conversely, when a data packet is transmitted from the root port 102 to the root port 103, the root port 102 flexibly accommodates the allocation of the reception buffer 130 with the root port 101, so that the throughput performance can be exerted without being affected by the size of the reception buffer 130. In the case where both the root port 101 and the root port 102 transmit a data packet to each other, both sides make a request to each other, so the root port 101 and the root port 102 use the adjustable shared area of 12 kB.

As described above, in the information processing device according to the present embodiment, the free buffer is lent and borrowed between the transmission modules without going through the reception module according to the use amount of the allocated area of the reception buffer. Thereby, securement of the throughput required by the transmission module and adjustment of the reception buffer may be easily performed. For example, in the communication mode in which a plurality of transmission sources transmits the data packets to one transmission destination, the throughput performance may be secured with a small amount of reception buffer resources. In particular, in the case where the communication latency is large because the distance between the transmission module and the reception module is long, the flexible accommodation of the reception buffer between the transmission modules by the information processing device according to the present embodiment is effective for improving the throughput performance. Moreover, if the distance between the transmission modules that flexibly accommodate the reception buffer is short, further improvement of the throughput performance is expected.

Second Embodiment

Next, a second embodiment will be described. An information processing device 1 according to the present embodiment is also illustrated in FIG. 1. Furthermore, a block diagram regarding management of a free buffer of the information processing device 1 according to the present embodiment is also illustrated in FIG. 2. In the following description, description of operations of respective units same as those of the first embodiment will be omitted.

In FIG. 1, in a case where a root port 101 and a root port 102 divide and use an adjustable shared area of 12 kB, if the root ports 101 and 102 each tries to transmit data packets to the root port 103 with a throughput of 64 GB/sec, packets are accumulated in a temporary buffer (not illustrated) set for the root ports 101 and 102. For example, by notifying each other of this accumulated amount when requesting allocation of the shared area of the reception buffer 130 of the root port 103 between the root port 101 and the root port 102, which one receives how much of the shared area of the reception buffer 130 of the root port 103 is determined, so that the reception buffer 130 of the root port 103 can be allocated according to a communication load between an endpoint 201 and the root port 101, and a communication load between an endpoint 202 and the root port 102. Therefore, the information processing device 1 according to the present embodiment allocates the shared area of the reception buffer 130 according to the communication load between the endpoint 202 and the root port 102. Hereinafter, processing of allocating a reception buffer 22 by the information processing device 1 according to the present embodiment will be described below with reference to FIG. 2.

A transmission unit 12 is supplied with a data packet to be transmitted to the reception module 20, but in a case where the data packet is not able to be transmitted to a reception module 20 for some reason, the transmission unit 12 stores the data packet in a temporary buffer (not illustrated) of a transmission module 10.

A lending request determination unit 133 determines whether a value obtained by subtracting the free buffer value at that time from the packet amount of the data packets accumulated in the temporary buffer is equal to or larger than a preset lending request threshold value 143. Then, when the obtained value is equal to or larger than the lending request threshold value 143, the lending request determination unit 133 transmits a lending request packet to the another transmission module 10 sharing the reception buffer 22 via the transmission unit 12 to make a lending request. Hereinafter, the packet amount of the data packets accumulated in the temporary buffer is referred to as a "temporary buffer amount", and the value obtained by subtracting the free buffer value at that time from the temporary buffer amount is referred to as a "difference amount".

When receiving the lending request, the lending request response unit 131 creates a lending response for lending acceptance when the difference amount in the transmission module 10 on which the lending request response unit itself is mounted falls below a preset lending acceptance threshold value 141. Then, the lending request response unit 131 transmits the created lending response to the transmission module 10 of the transmission source of the lending request packet via the transmission unit 12.

Modification

As another first method, the following configuration can also be used. The lending request determination unit 133 issues the lending request in the case where the free buffer value falls below the lending request threshold value 143. At this time, the lending request determination unit 133 adds information of the temporary buffer amount or the difference amount to a supply packet and transmits the supply packet.

In the case of receiving the lending request, the lending request response unit 131 compares the temporary buffer amount or the difference amount in the transmission module 10 on which the lending request response unit itself is mounted with the temporary buffer amount or the difference amount in the transmission module 10 of the lending request source. Then, for example, when the difference exceeds the preset lending acceptance threshold value 141, the lending request response unit 131 generates the lending response of lending acceptance and transmits the lending response to the transmission module 10 of the lending request source via the transmission unit 12.

Furthermore, as another second method, the following configuration can also be used. For example, consider a case where a condition for making a lending request is still satisfied even if the free buffer calculation unit 132 adds a lending unit amount to the free buffer value in response to the lending acceptance response to the lending request. In that case, the lending request determination unit 133 may make a lending request to the another transmission module 10 sharing the reception buffer 22 again in the same procedure as the first time. Furthermore, in a case of receiving a preset upper limit number of lendings, the lending request determination unit 133 does not have to make a lending request even if the condition for making a lending request is satisfied thereafter. The lending request response unit 131 also determines lending acceptance in the same manner for the second lending request.

Furthermore, as another third method, the following configuration can also be used. In a case where the communication load drops and the free buffer value exceeds a preset return threshold value after the lending request is accepted and the free buffer value is increased by the free buffer calculation unit 132, the free buffer calculation unit 132 subtracts the lending unit amount from the free buffer value. Moreover, the free buffer calculation unit 132 notifies the transmission module 10 as the lending source of return via the transmission unit 12.

In the case of receiving the return notification, the free buffer calculation unit 132 of the transmission module 10 that has received the return notification adds the lending unit amount to the free buffer value. Thereafter, the free buffer calculation unit 132 transmits the response to the transmission module 10 as a lending destination. Here, the free buffer calculation unit 132 may add a rule such as not making a lending request during the return notification.

Here, subtraction at the return source is performed first so that the total free buffer value of the reception buffer 22 allocated to the transmission module 10 as the lending destination and the transmission module 10 as the lending source does not exceed the upper limit of the size of the reception buffer 22, and then addition at the return destination is performed.

As described above, even in the configuration to make a lending request and a lending response other than the first embodiment, the allocation of the shared area of the reception buffer can be directly exchanged between the transmission modules. Even in this case, securement of the throughput required by the transmission module and adjustment of the reception buffer can be easily performed.

Third Embodiment

Figure 4:
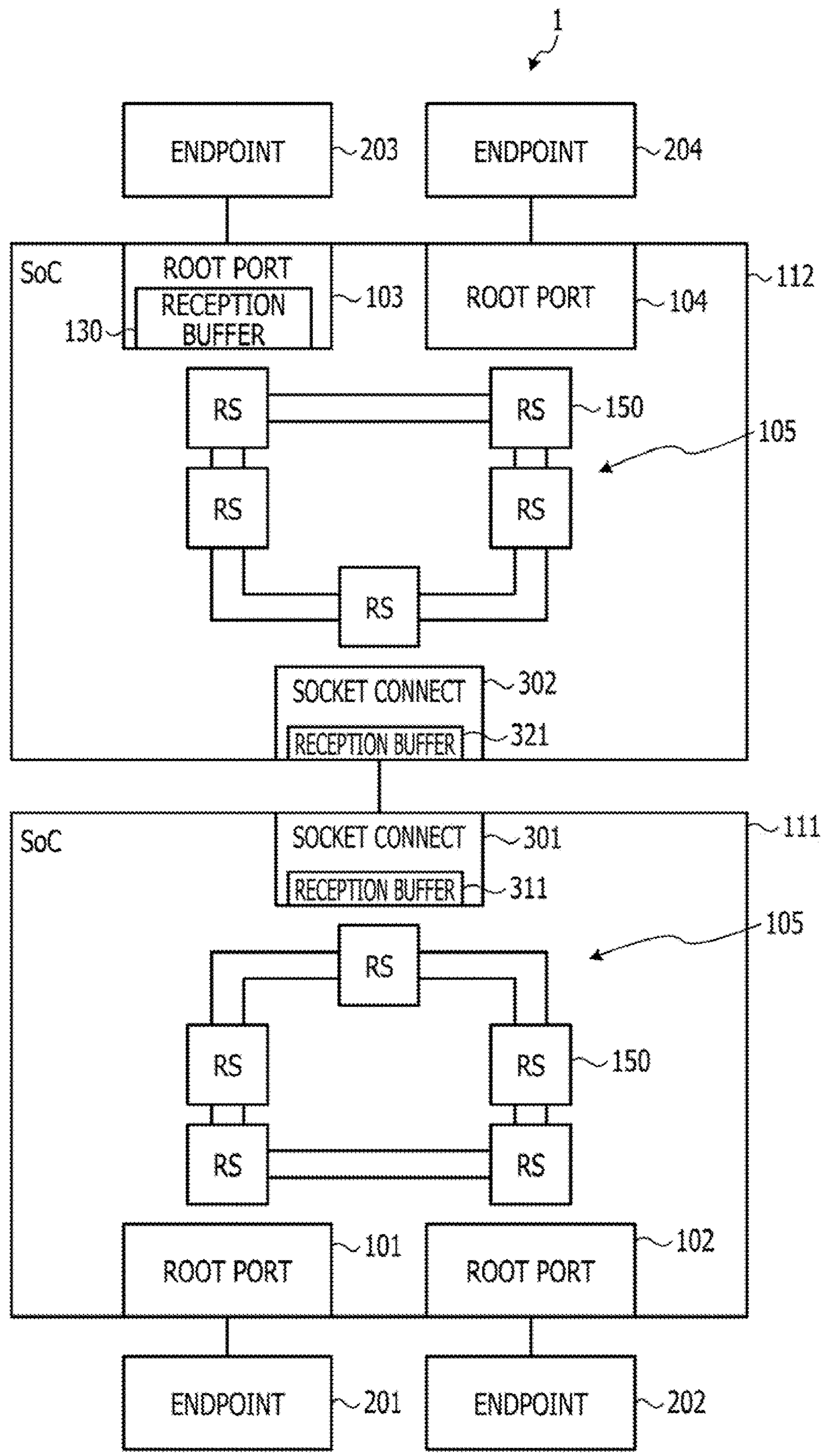
FIG. 4 is a configuration diagram of an information processing device according to a third embodiment.

FIG. 4 is a configuration diagram of an information processing device according to a third embodiment. In the following description, description of operations of respective units same as those of the first embodiment will be omitted.

An information processing device 1 according to the present embodiment is a system in which an SoC 111 equipped with root ports 101 and 102 and an SoC 112 equipped with root ports 103 and 104 are connected and used. Consider a case of transmitting data packets from the root ports 101 and 102 mounted on one SoC 111 to the root port 103 of the other SoC 112. Here, even if there are two SoCs 111 and 112, the operation is similar to that of the first embodiment as long as the root port 101 and the root port 102 communicate with the root port 103 without interposing other communication connections.

Here, there is another communication connection connecting the SoC 111 and the SoC 112, and the communication is performed between a socket connect 301 and a socket connect 302. The communication connection between the SoC 111 and the SoC 112 may be temporarily unable to communicate due to a communication quality problem similar to the communication between the root port 103 and the endpoint 203 described in the first embodiment. Therefore, the socket connects 301 and 302 have reception buffers 311 and 321, which store data packets received from the root port 101 or 102, respectively. A case of using the reception buffers 311 and 321 by the root port 101 and the root port 102 will be described.

In this case, a part of the reception buffer 311 included in the socket connect 301 is shared by the root port 101 and the root port 102. Then, the root port 101 and the root port 102 flexibly accommodate allocation of a shared area of the reception buffer 311, similarly to the accommodation of the reception buffer 22 in the first embodiment. This also similarly applies to the reception buffer 321 included in the socket connect 302.

As described above, in the case where another communication connection exists between the transmission module and the reception module as in the information processing device according to the present embodiment, a unit that makes the communication connection is set as the reception module, and allocation of the shared area of the reception buffer included in the unit can be flexibly accommodated between the transmission modules without the reception module. Thereby, securement of the throughput required by the transmission module and adjustment of the reception buffer may be easily performed.

Fourth Embodiment

Figure 5:
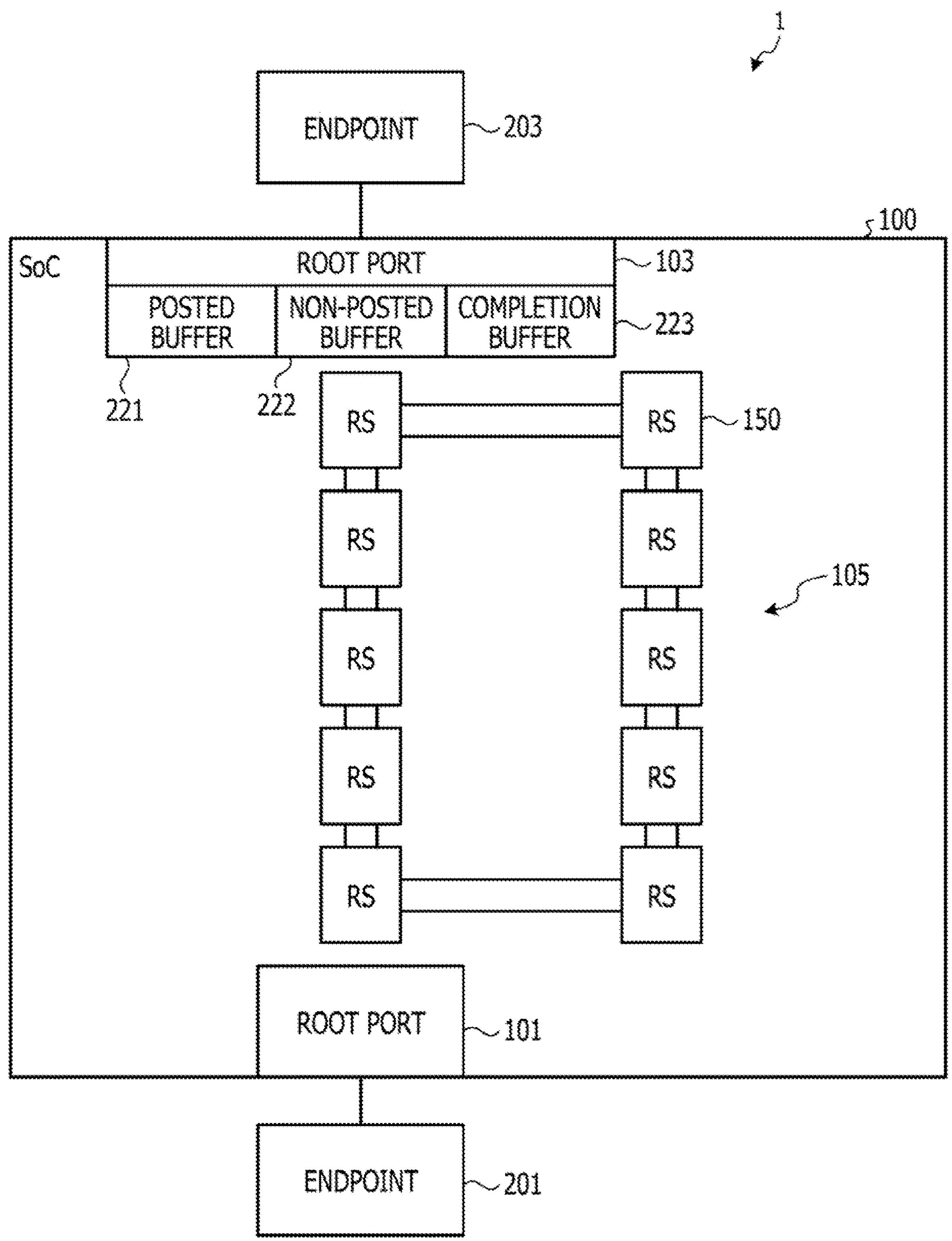
FIG. 5 is a configuration diagram of an information processing device according to a fourth embodiment.

FIG. 5 is a configuration diagram of an information processing device according to a fourth embodiment. In the following description, description of operations of respective units same as those of the first embodiment will be omitted.

An information processing device 1 according to the present embodiment is the same as that of the first embodiment in arrangement of each unit on an SoC 100 and a communication mode. In the information processing device 1 according to the present embodiment, a root port 103 on a reception side has a plurality of different reception buffers depending on types of packet.

In PCIe, there are three types of packets: posted packet, non-posted packet, and completion packet, and order guarantee on their communication path is specified. For example, for the purpose of guaranteeing a rewriting order of data, during a period from when the posted packet is transmitted to when a packet transmitted thereafter arrives at a final transmission destination, the packet transmitted later is prohibited from overtaking the previously transmitted posted packet. Furthermore, in addition to the condition for the posted packet, it is defined that the posted packets can overtake the non-posted packet and the completion packet in order to avoid deadlocks in communication. This defines that even if the non-posted packet or the completion packet is clogged on the communication path, the posted packet transmitted later has to arrive at the transmission destination by overtaking the non-posted packet and the completion packet on the communication path.

To implement these definitions, in the present embodiment, when communication is performed between the root port 101 and the root port 103, the root port 103 has a posted buffer 221, a non-posted buffer 222, and a completion buffer 223 for each type of packet.

Thereby, even if both the non-posted packet and the completion packet are clogged, for example, the posted buffer 221 for the posted packet is secured, so the root port 101 can transmit the posted packet to the root port 103. Thereby, the root port 103 can cause the posted packet to overtake the non-posted packet and the completion packet and transmit the posted packet to the endpoint 203.

Here, the posted packet and the completion packet may be accompanied by data, and both are expected to have high throughput performance. However, similarly to the description in the first embodiment, the upper limit of the total throughput of all the packets between the root port 103 and the endpoint 203 is 64 GB/sec. Therefore, the posted packet and the completion packet do not reach 64 GB/sec at the same time, and the total throughput of both the packets should reach 64 GB/sec. However, in the case of only one of the packets, each packet is expected to achieve 64 GB/sec. This situation is the same as the case where the data packet is transmitted from the root ports 101 and 102 to the root port 103 of the first and second embodiments.

Therefore, the root port 101 according to the present embodiment can reduce the total size of the reception buffer of the root port 103 by sharing a part of the posted buffer 221 and a part of the completion buffer 223. In the present embodiment, when transmitting the posted packet and the completion packet, the root port 101 internally adjusts a ratio of use amounts of the posted buffer 221 and the completion buffer 223 of the root port 101.

For example, it can be considered that the root port 101 incorporates the functions of the two transmission modules 10 illustrated in FIG. 2. In that case, one transmission module 10 transmits the posted packet to the posted buffer 221 of the root port 103 which is the reception module 20, and the other transmission module 10 transmits the completion packet to the completion buffer 223.

Note that it is defined that the posted packet can overtake the completion packet. Therefore, a part of the posted buffer 221 and a part of the completion buffer 223 can be shared, but it is preferable that a minimum buffer is allocated in each of the posted buffer 221 and the completion buffer 223 regardless of the accommodation state between them.

As described above, the information processing device according to the present embodiment adjusts the allocation of the reception buffer to the posted packet and the allocation of the reception buffer to the completion packet inside one root port. For example, in the information processing device according to the present embodiment, delay of adjusting the allocation of the reception buffer is almost zero, and the size of the reception buffer may be suppressed to a small size. Thereby, securement of the throughput required for each type of packet and adjustment of the reception buffer may be easily performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:

a reception module; and a first transmission module and a second transmission module configured to transmit a packet to the reception module, the reception module includes a reception buffer that is shared by the first transmission module and the second transmission module to store the packet, the first transmission module is configured to: transmit, to the second transmission module, a lending request of the reception buffer allocated to the second transmission module, on a basis of a use amount of the reception buffer allocated to the first transmission module, and increase an allocation amount of the reception buffer for the first transmission module in a case where the second transmission module has transmitted an acceptance response to the lending request, and the second transmission module is configured to: receive the lending request and transmit the acceptance response to the first transmission module on a basis of a use amount of the reception buffer allocated to the second transmission module, and decrease an allocation amount of the reception buffer for the second transmission module in a case of transmitting the acceptance response, the first transmission module transmits the lending request in a case where an unused amount of the reception buffer allocated to the first transmission module is less than a predetermined lending request threshold value, the second transmission module transmits the acceptance response in a case where an unused amount of the reception buffer allocated to the second transmission module is equal to or lamer than a predetermined lending acceptance threshold value.

2. The information processing device according to claim 1, wherein a relay device is included between the first and second transmission modules and the reception module, the relay device has another reception buffer shared by the first transmission module and the second transmission module and configured to store the packet, and the relay device configured to receive the packets transmitted from the first transmission module and the second transmission module and to store the packets in the another reception buffer, and to transfer the packets to the reception module, the first transmission module transmits another lending request of the another reception buffer allocated to the second transmission module to the second transmission module on a basis of a use amount of the another reception buffer allocated to the first transmission module, the first transmission module increases an allocation amount of the another reception buffer for the first transmission module in a case where the second transmission module has transmitted another acceptance response to the another lending request, the second transmission module receives the another lending request, and transmits the another acceptance response to the first transmission module on a basis of a use amount of the another reception buffer allocated to the second transmission module, and the second transmission module decreases an allocation amount of the another reception buffer for the second transmission module in a case where the another acceptance response is transmitted.

3. The information processing device according to claim 1, wherein the first transmission module transmits a first packet, and the second transmission module transmits a second packet of a type different from that of the first packet, and whose behavior with respect to the first packet on a communication path is defined.

4. A method of controlling an information processing device including a reception module, and a first transmission module and a second transmission module configured to transmit a packet to the reception module, the method comprising:

causing the first transmission module to perform processing of, in a reception buffer included in the reception module, and configured to store the packet and shared by the first transmission module and the second transmission module, transmitting a lending request of the reception buffer allocated to the second transmission module to the second transmission module on a basis of a use amount of the reception buffer allocated to the first transmission module, and increasing an allocation amount of the reception buffer for the first transmission module in a case where the second transmission module has transmitted an acceptance response to the lending request; and causing the second transmission module to perform processing of receiving the lending request and transmitting the acceptance response to the first transmission module on a basis of a use amount of the reception buffer allocated to the second transmission module, and decreasing an allocation amount of the reception buffer for the second transmission module in a case of transmitting the acceptance response, the first transmission module transmits the lending request in a case where an unused amount of the reception buffer allocated to the first transmission module is less than a predetermined lending request threshold value, the second transmission module transmits the acceptance response in a case where an unused amount of the reception buffer allocated to the second transmission module is equal to or larger than a predetermined lending acceptance threshold value.

* * * * *